(12) United States Patent
Marsico (10) Patent No.: US 7,720,463 B2
(45) Date of Patent: May 18, 2010

(54) METHODS, SYSTEMS, AND COMPUTER PROGRAM PRODUCTS FOR PROVIDING THIRD PARTY CONTROL OF ACCESS TO MEDIA CONTENT AVAILABLE VIA BROADCAST AND MULTICAST SERVICE (BCMCS)

(75) Inventor: Peter Joseph Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 878 days.

(21) Appl. No.: 11/505,699

(22) Filed: Aug. 17, 2006

(65) Prior Publication Data

US 2007/0124785 A1    May 31, 2007

Related U.S. Application Data

(63) Continuation-in-part of application No. 11/440,797, filed on May 25, 2006.

(60) Provisional application No. 60/714,060, filed on Sep. 2, 2005, provisional application No. 60/748,569, filed on Dec. 8, 2005.

(51) Int. Cl.
*H04M 1/66* (2006.01)
*H04M 1/68* (2006.01)
*H04M 3/16* (2006.01)

(52) U.S. Cl. .......................... 455/410; 455/411; 725/25
(58) Field of Classification Search ........................ None
See application file for complete search history.

(56) References Cited

U.S. PATENT DOCUMENTS 6,904,058 B2    6/2005   He et al.
7,191,332 B1 *  3/2007   Pankajakshan et al. ...... 713/163

(Continued)

FOREIGN PATENT DOCUMENTS

WO    WO 02/15607 A2    2/2002

(Continued)

OTHER PUBLICATIONS

Commonly-assigned, co-pending U.S. Appl. No. 12/276,251 for "Methods, Systems, and Computer Program Products for Providing Media Content Delivery Audit and Verification Services," (Unpublished, filed Nov. 21, 2008).

(Continued)

*Primary Examiner*—Ajit Patel
(74) *Attorney, Agent, or Firm*—Jenkins, Wilson, Taylor & Hunt, P.A.

(57) ABSTRACT

The subject matter described herein includes methods, systems, and computer program products for providing third party control of access to media content available via broadcast and multicast service (BCMCS). According to one method, control of access to streaming media content to a subscriber terminal via a BCMCS may be implemented at a network element, such as an authentication, authorization and accounting (AAA) server or a BCMCS controller. The method may include receiving a message associated with a request for access to streaming media content by a requesting mobile subscriber. Mobile subscriber identification and requested content identification information are determined from the message. The mobile subscriber identification is used to identify a content viewing rule for the requesting mobile subscriber. The content identification is used to determine whether allowing the subscriber to view the content would violate the content viewing rule.

41 Claims, 7 Drawing Sheets

U.S. PATENT DOCUMENTS

| | | | |
|---|---|---|---|
| 7,388,855 | B2 * | 6/2008 | Madour .................. 370/338 |
| 2002/0141584 | A1 | 10/2002 | Razdan et al. |
| 2002/0184527 | A1 | 12/2002 | Chun et al. |
| 2003/0032409 | A1 | 2/2003 | Hutcheson et al. |
| 2003/0134622 | A1 * | 7/2003 | Hsu et al. ................ 455/414 |
| 2003/0211843 | A1 | 11/2003 | Song et al. |
| 2004/0109558 | A1 | 6/2004 | Koch |
| 2004/0167977 | A1 | 8/2004 | Douglas et al. |
| 2004/0198371 | A1 | 10/2004 | Balasubramanian et al. |
| 2005/0015583 | A1 * | 1/2005 | Sarkkinen et al. ......... 713/150 |
| 2005/0038707 | A1 | 2/2005 | Roever et al. |
| 2005/0047335 | A1 | 3/2005 | Cheng et al. |
| 2005/0079869 | A1 | 4/2005 | Khalil et al. |
| 2005/0086683 | A1 * | 4/2005 | Meyerson ................... 725/30 |
| 2005/0102397 | A1 | 5/2005 | Tsuyama et al. |
| 2005/0138379 | A1 | 6/2005 | Semple et al. |
| 2006/0161626 | A1 | 7/2006 | Cardina et al. |
| 2006/0165227 | A1 | 7/2006 | Steeb et al. |
| 2006/0271488 | A1 | 11/2006 | Maes |
| 2007/0042757 | A1 * | 2/2007 | Jung et al. .............. 455/412.2 |
| 2007/0049342 | A1 * | 3/2007 | Mayer et al. .............. 455/558 |
| 2007/0050510 | A1 | 3/2007 | Jiang |
| 2007/0067794 | A1 | 3/2007 | Russell et al. |
| 2007/0086380 | A1 * | 4/2007 | Lim et al. ................. 370/329 |
| 2007/0086437 | A1 * | 4/2007 | DiFazio et al. ............. 370/352 |
| 2007/0094142 | A1 | 4/2007 | Russell et al. |
| 2007/0094712 | A1 * | 4/2007 | Gibbs et al. .................. 726/3 |
| 2007/0124784 | A1 * | 5/2007 | Shon et al. ................. 725/105 |
| 2007/0220106 | A1 * | 9/2007 | Reisman ................... 709/217 |
| 2007/0275742 | A1 * | 11/2007 | Zhang ...................... 455/466 |
| 2008/0276304 | A1 * | 11/2008 | Maffione et al. .............. 726/4 |
| 2009/0075635 | A1 | 3/2009 | Russell et al. |
| 2009/0147721 | A1 * | 6/2009 | Shim et al. ................. 370/312 |
| 2009/0157697 | A1 * | 6/2009 | Conway et al. .............. 707/10 |

FOREIGN PATENT DOCUMENTS

| | | |
|---|---|---|
| WO | WO 2007/027895 A2 | 3/2007 |
| WO | WO 2007/030270 A2 | 3/2007 |
| WO | WO 2007/050590 A2 | 5/2007 |

OTHER PUBLICATIONS

Restriction and/or Election Requirement for U.S. Appl. No. 11/413,064 (Oct. 31, 2008).

Communication of European Publication Number and Information on the Application of Article 67(3) EPC for European Patent No. 1949331 (Jul. 2, 2008).

Communication of European Publication Number and Information on the Application of Article 67(3) EPC for European Application No. 06801317.6 (May 28, 2008).

Notification of Transmittal of the International Search Report and the Written Opinion of the International Searching Authority, or the Declaration corresponding to PCT Application No. PCT/US06/41450 (Jan. 22, 2008).

Official Action for U.S. Appl. No. 11/413,064 (Dec. 23, 2008).

Interview Summary for U.S. Appl. No. 11/413,064 (Apr. 3, 2009).

Harte, "10 Things You Need to Know About IP Television," www.IPTVMagazine.com, pp. 27-34 (Jul. 2005).

Lee, "3GPP2 Broadcast and Multicast Services BCMCS," KRnet2005, pp. 1-40, (Jun. 2005).

"Broadcast and Multicast Service in cdma2000 Wireless IP Network," 3rd Generation Partnership Project 2, 3GPP2 X.S0022-0, Version 1.0, 98 pages (Dec. 2004).

"Broadcast and Multicast Service in cdma2000® Wireless IP Network," TIA-1041 Ballot Version (Aug. 2004).

Wang et al., "Broadcast and Multicast Services in cdma2000," IEEE Communications Magazine, pp. 76-82 (Feb. 2004).

Calhoun et al., "Diameter Base Protocol," RFC Archive RFC 3588, Network Working Group, Ericsson, pp. 1-149, Ericsson (Sep. 2003).

Marcovici, "Joint Meeting 3GPP / 3GPP2," 3rd Generation Partnership Project 2, "3GPP2" S3-030450, pp. 1-25 (Jul. 16, 2003).

Rose et al., "BCMCS Security Framework," QUALCOMM S3-030451, pp. 1-24 (Jul. 16, 2003).

Kasargod et al., Packet data in the Ericsson CDMA2000 radio access network, Ericsson Review No. 3 (2002).

Chuah et al., Quality of Service in Third-Generation IP-Based Radio Access Networks, Bell Labs Technical Journal 7(2), pp. 67-89 (2002).

Aboba et al., "RADIUS and IPv6," Network Working Group, www.ietf.org/rfc/rfc3162.txt, pp. 1-12 (Aug. 2001).

Rigney, "RADIUS Accounting," Network Working Group, www.ietf.org/rfc/rfc2866.txt, pp. 1-27 (Jun. 2000).

Rigney et al., "Remote Authentication Dial in User Service (RADIUS)," www.ieft.org/rfc rfc2865.txt, pp. 1-71 (Jun. 2000).

Fielding et al., "Hypertext Transfer Protocol—HTTP/1.1," Network Working Group, W3C/MIT, 114 pgs., Jun. 1999.

de Goyeneche, "Multicast over TCP/IP HOWTO," v1.0, pp. 1-30 (Mar. 20, 1998).

Semeria et al., "Introduction to IP Multicast Routing," draft-semeria-multicast-intro-00.txt, pp. 1-15 (May 1996).

Notification of Transmittal of the International Search Report and the Written Opinion of the International Searching Authority, or the Declaration for International Application No. PCT/US06/34034 (Sep. 24, 2007).

Final Official Action for U.S. Appl. No. 11/413,064 (Jun. 25, 2009).

* cited by examiner

METHODS, SYSTEMS, AND COMPUTER PROGRAM PRODUCTS FOR PROVIDING THIRD PARTY CONTROL OF ACCESS TO MEDIA CONTENT AVAILABLE VIA BROADCAST AND MULTICAST SERVICE (BCMCS)

RELATED APPLICATIONS

This application is a continuation-in-part of U.S. patent application Ser. No. 11/440,797 filed May 25, 2006, which claims the benefit of U.S. Provisional Patent Application Ser. No. 60/714,060, filed Sep. 2, 2005, the disclosure of each of which is incorporated herein by reference in its entirety. This application further claims the benefit of U.S. Provisional Patent Application Ser. No. 60/748,569, filed Dec. 8, 2005; the disclosure of which is incorporated herein by reference in its entirety.

TECHNICAL FIELD

The subject matter described herein relates to providing control functions for media content available for delivery to user terminals. More particularly, the subject matter described herein relates to methods, systems, and computer program products for providing third party control of access to media content available via broadcast and multicast service (BCMCS).

BACKGROUND

Broadcast and multicast service (BCMCS) supports the broadcasting and multicasting of video or other media content to mobile subscribers in cdma2000 networks. BCMCS specifications, including 3GPP2 X.S0022-0 *Broadcast and Multicast Service in cdma2000 Wireless IP Network*, Version 1.0, December 2004, the disclosure of which is incorporated herein by reference in its entirety, define signaling procedures associated with setup and teardown of facilities used to deliver streaming media content to wireless subscribers.

BCMCS services are accessible by any authorized subscriber with a BCMCS-capable user terminal, however, the authorized subscriber may be a minor, or other individual for whom it may be desirable to prevent or control certain content from being viewed by the subscriber. The above-referenced BCMCS specifications do not provide a mechanism for parties other than the content provider to control access to content delivered via a BCMCS.

Accordingly, there exists a long felt need for methods, systems, and computer program products for methods, systems, and computer program products for providing third party control of access to media content available via broadcast and multicast service.

SUMMARY

The subject matter described herein includes methods, systems, and computer program products for providing third party control of access to media content available via broadcast and multicast service. As used herein, the phrase "broadcast and multicast service" refers to any industry standard definition or understanding of this phrase. One example of such a definition or understanding may be a service where media content is made available for viewing over a mobile communications network to a plurality of mobile subscribers who join a broadcast or multicast group through which the content is offered. Examples of BCMCS services include 3GPP BCMCS services, as defined in the above-referenced 3GPP document and BCMCS in 3G or 4G networks, as described in Wang, et al., Broadcast and Multicast Services in cdma2000, IEEE Communications Magazine, pages 76-83, February 2004, the disclosure of which is incorporated herein by reference in its entirety. One example of content that may be made available over the mobile communications network is streaming media content, such as IP television (IP TV).

According to one method, control of access to streaming media content to a subscriber terminal via a BCMCS may be implemented at a network element, such as an authentication, authorization and accounting (AAA) server or a BCMCS controller. The method may include receiving a message associated with a request for access to streaming media content by a requesting mobile subscriber. Mobile subscriber identification and requested content identification information are determined from the message. The mobile subscriber identification is used to identify a content viewing rule for the requesting mobile subscriber. The content identification is used to determine whether allowing the subscriber to view the content would violate the content viewing rule.

The subject matter described herein providing third-party control over access to content available via a BCMCS may be implemented using a computer program product comprising computer executable instructions embodied in a computer readable medium. Exemplary computer readable media suitable for implementing the subject matter described herein include disk memory devices, programmable logic devices, and application specific integrated circuits. In addition, a computer readable medium that implements the subject matter described herein may be located on a single device or computing platform or may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

According to one aspect, the subject matter described herein includes a media content access control function, which resides in a BCMCS network, and which is configurable by a third-party; i.e., someone other than the media content provider and the subscriber seeking to view the content. In one embodiment, a media content access controller (MCAC) may access a media content viewing rules database to determine whether to allow a subscriber to view media content accessible via a BCMCS. The MCAC may analyze information associated with a request for BCMCS service and query viewing rules stored in the database. Analyzing information associated with a request for BCMCS service may include analyzing information associated with a request by a mobile subscriber for a BCMCS broadcast access key (BAK) that is associated with a particular BCMCS program. Alternatively, analyzing information associated with a request for BCMCS service may include analyzing information associated with a request by a mobile subscriber for the establishment of an R-P connection/session associated with a particular BCMCS program. Information analyzed may include a mobile subscriber identifier (e.g., network address, IP address, email address, mobile identification number, MSISDN, IMSI, etc.), a BCMCS program identifier (e.g., program name, multicast IP address/port, program ID, BCMCS Flow ID, etc.), and request timestamp/program scheduling time information.

Figure 1:
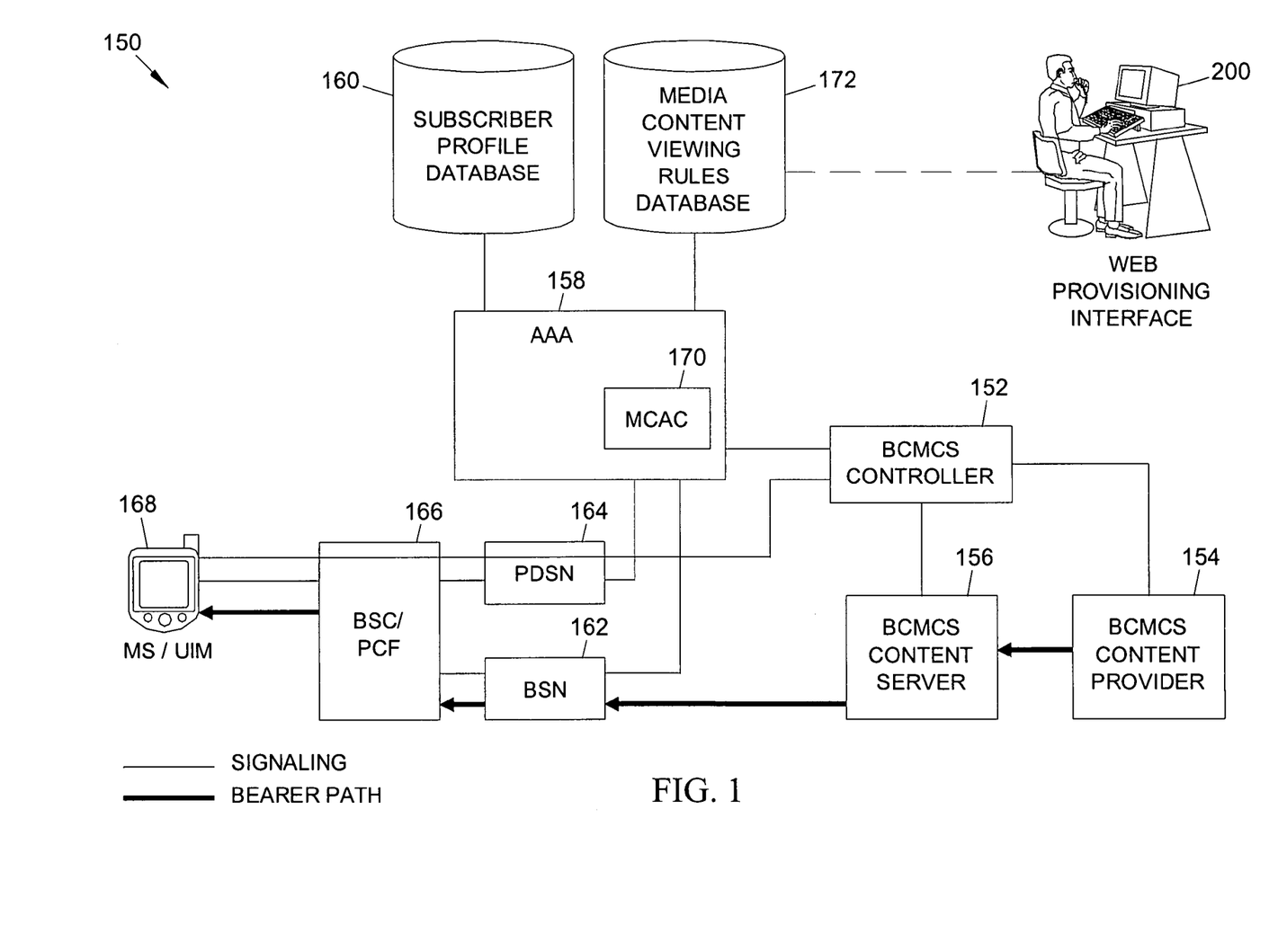
FIG. 1 is a block diagram of a BCMCS delivery network including an AAA-implemented media content access control application according to an embodiment of the subject matter described herein.

According to one exemplary embodiment illustrated in FIG. 1, the media content access controller may be integrated or co-located with an authentication, authorization, and accounting (AAA) function that authorizes a mobile subscriber to view a BCMCS program. The AAA-integrated media content access controller may examine one or more BCMCS program viewing request messages received by the AAA server, extract mobile subscriber identification and requested BCMCS program identification information from the message(s), and query the media content rules database to determine if viewing of the requested BCMCS program by the requesting mobile subscriber would violate any viewing rules that have been defined for the mobile subscriber.

More particularly, in FIG. 1, a BCMCS network environment 150 includes a BCMCS controller 152, a BCMCS content provider 154, a BCMCS content server 156, an authentication, authorization, and accounting (AAA) function 158, a BCMCS subscriber profiles database 160, a broadcast serving node (162), a base station controller (BSC)/packet control function (PCF) 166, and a BCMCS mobile subscriber (MS) 168.

BCMCS controller 152 manages and provides BCMCS session information to BSN 162, BCMCS content server 156, and mobile subscriber 168. BCMCS controller 152 communicates BCMCS session information to BSN 162 via interface 170. The BCMCS session information may include IP multicast flow treatment information, QoS information, and BCMCS flow identifier to multicast IP address and port mapping information. Communications between BCMCS controller 152 and BSN 162 may involve AAA function 158 and may utilize RADIUS, DIAMETER or other suitable protocols. A detailed description of the RADIUS protocol can be found in Internet Engineering Task Force (IETF) RFC 3162 *RADIUS and IPv6*, August 2001, RFC 2865 *Remote Authentication Dial In User Service* (*RADIUS*), June 2000, and RFC 2866 *RADIUS Accounting*, June 2000, the disclosures of which are incorporated herein by reference in their entirety. A detailed description of the DIAMETER protocol can be found in IETF RFC 3588 *Diameter Base Protocol*, September 2003, the disclosure of which is incorporated herein by reference in its entirety.

BCMCS controller 152 may communicate with BCMCS content provider 154 via interface 172 to obtain and/or provide content provider identification information, program identification information, session description information (e.g., media format, codec type, etc.), security information, and other BCMCS service related information. Any number of protocols may be used to facilitate the communication of such information on the BCMCS controller to BCMCS content provider interface including proprietary protocols, and non-proprietary protocols, such as IP/TCP/HTTP/XML.

BCMCS content provider 154 is the creator or source of the media content, while BCMCS content server 156 provides BCMCS content to mobile subscriber 168 using an IP multicast stream. BCMCS content server 156 may store and forward media content provided by the BCMCS content provider 154 and consolidate or merge media content provided by multiple content providers in the network. BCMCS controller 152 may communicate with BCMCS content server 156 via interface 174 to obtain and/or provide security information, multicast IP address and port information, and BCMCS content management information (e.g., BCMCS session start time, session duration, etc.). Any number of protocols may be used to facilitate the communication of such information on the BCMCS controller to BCMCS content server interface including proprietary protocols and non-proprietary protocols, such as IP/TCP/HTTP/XML.

AAA function 158 may provide BCMCS-related authentication and authorization of BCMCS subscribers. AAA function 158 may also provide BCMCS-related accounting functions. In order to provide such services, AAA function 158 may access BCMCS subscriber profile database 160 to obtain BCMCS subscriber specific information. AAA function 158 may communicate with other BCMCS network elements using protocols such as RADIUS, DIAMETER or other suitable protocols. BCMCS controller 152 may communicate with AAA function 158 to obtain authentication and authorization information for a BCMCS subscriber. BCMCS controller 152 may provide accounting information associated with a BCMCS subscriber to AAA function 158. As described above, BCMCS controller to AAA function interface 170 may also be used to relay BCMCS session information between BCMCS controller 152 and BSN 162.

Certain BCMCS networking scenarios may include multiple AAA functions, such as a serving AAA function and a home AAA function. For purposes of illustration, a single AAA function 158 is described herein. If multiple AAA functions are involved in a BCMCS transaction, each AAA function may have an associated media content access controller for third party control of access to media content requested by a subscriber.

BCMCS controller 152 may communicate with a BCMCS client application associated with subscriber 168 via interface 176 to provide BCMCS-related session information including program identification information, BCMCS flow identification information, broadcast access key (BAK) information, BCMCS session start time information, BCMCS session duration information, BCMCS session description information (e.g., media format, codec type, etc.), and BCMCS flow treatment. Protocols used on BCMCS controller MS interface 176 may include IP/TCP/HTTP/XML.

BSN 162 communicates with BSC/PCF function 166 via interface 178 to manage IP multicast flows and to facilitate BCMCS accounting based on octet counts. PDSN 164 may communicate with MS 168 using unicast packet data service.

BCMCS mobile subscriber 168 may perform BCMCS information acquisition and BCMCS registration, and receive BCMCS-related IP multicast flows from content server 156.

According to an embodiment of the subject matter described herein, media content access controller 170 is co-located with AAA function 158. Media content viewing rules database 172 is also co-located with AAA function 158. Media content viewing rules database 172 may include viewing rules for each subscriber. The content viewing rules may be provisionable via an interface, such as web provisioning interface 174. Media content access controller 170 may receive a message associated with the delivery of media content to a subscriber and may extract subscriber identification information from the message. This information may be used to access viewing rules for the subscriber in database 172. Media content access controller 170 may also extract content information from the message to identify the content requested to be delivered. Using the content identification information and the extracted rule, media content access controller 170 may determine whether delivering the media content to the subscriber would violate the rule.

Figure 2:
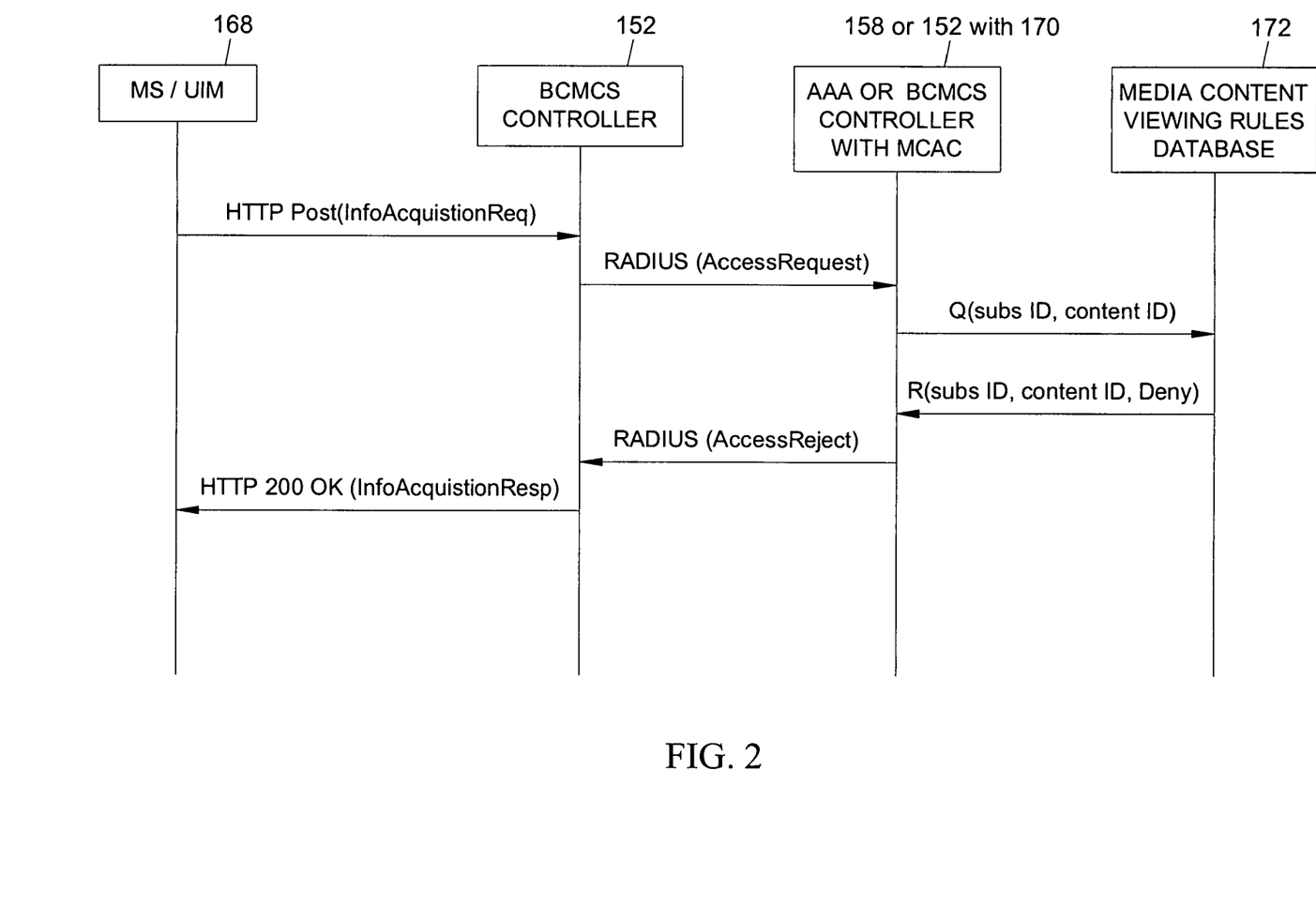
FIG. 2 is a message flow diagram illustrating exemplary messages that may be exchanged in implementing a media content access control function for third-party control of access to media content accessible by a user terminal via a BCMCS according to an embodiment of the subject matter described herein.

In the case that a rule violation is detected, media content access controller 170 of AAA function 158 may take an appropriate action, such as blocking or rejecting access to the requested BCMCS program by the requesting mobile subscriber. For example, as illustrated in FIG. 2, media content access controller may examine a RADIUS AccessRequest message sent by BCMCS controller 152 that is associated with a BCMCS program viewing request of mobile subscriber. Using information contained in the AccesRequest message, media content access controller 170 is adapted to query database 172 and determine if a defined program content viewing rule has been/would be violated if the requesting mobile subscriber views the requested BCMCS program content. If it is determined, based on the mobile subscriber viewing rules contained in database 172, that a viewing rule associated with the mobile subscriber prohibits viewing of the requested program by the requesting mobile subscriber, then media content access controller 170 may return an Access-Reject message to BCMCS controller 152, which in turn, may notify requesting mobile subscriber 168 of the disapproval/viewing content rule violation (e.g., an InformationAcquistionResponse sent to the requesting mobile subscriber may include a RejectReason value that indicates a viewing rule violation as the reason for the authorization failure).

As illustrated in FIG. 1, provisioning of program viewing rules may be achieved through a user interface, which is accessible via the public Internet, world wide web, or a proprietary communications interface. In one exemplary embodiment, the parents of a BCMCS subscriber (e.g., minor, child, teen, etc.) may directly provision BCMCS program content viewing rules via an easy to use, web-based graphical user interface (GUI). Alternatively, provisioning of program viewing rules may be performed on behalf of the parent or guardian by a BCMCS network operator.

Exemplary media content viewing rules are illustrated below in Table 1.

TABLE 1

Exemplary Program Viewing Rules

| Subscriber ID | Program Name | Program Rating | Program Attribute | Program Curfew Time | Action | Contact |
|---|---|---|---|---|---|---|
| child@vzw.net | "The Dirty Movie" | — | — | — | Notify Block | SMS: 9194691000 |
| teen@vzw.net | — | R, X | — | — | Block | — |
| student@vzw.net | — | — | SC, P | — | Block | — |
| kid@vzw.net | — | — | — | 8:00 pm | Block | — |

Figure 3:
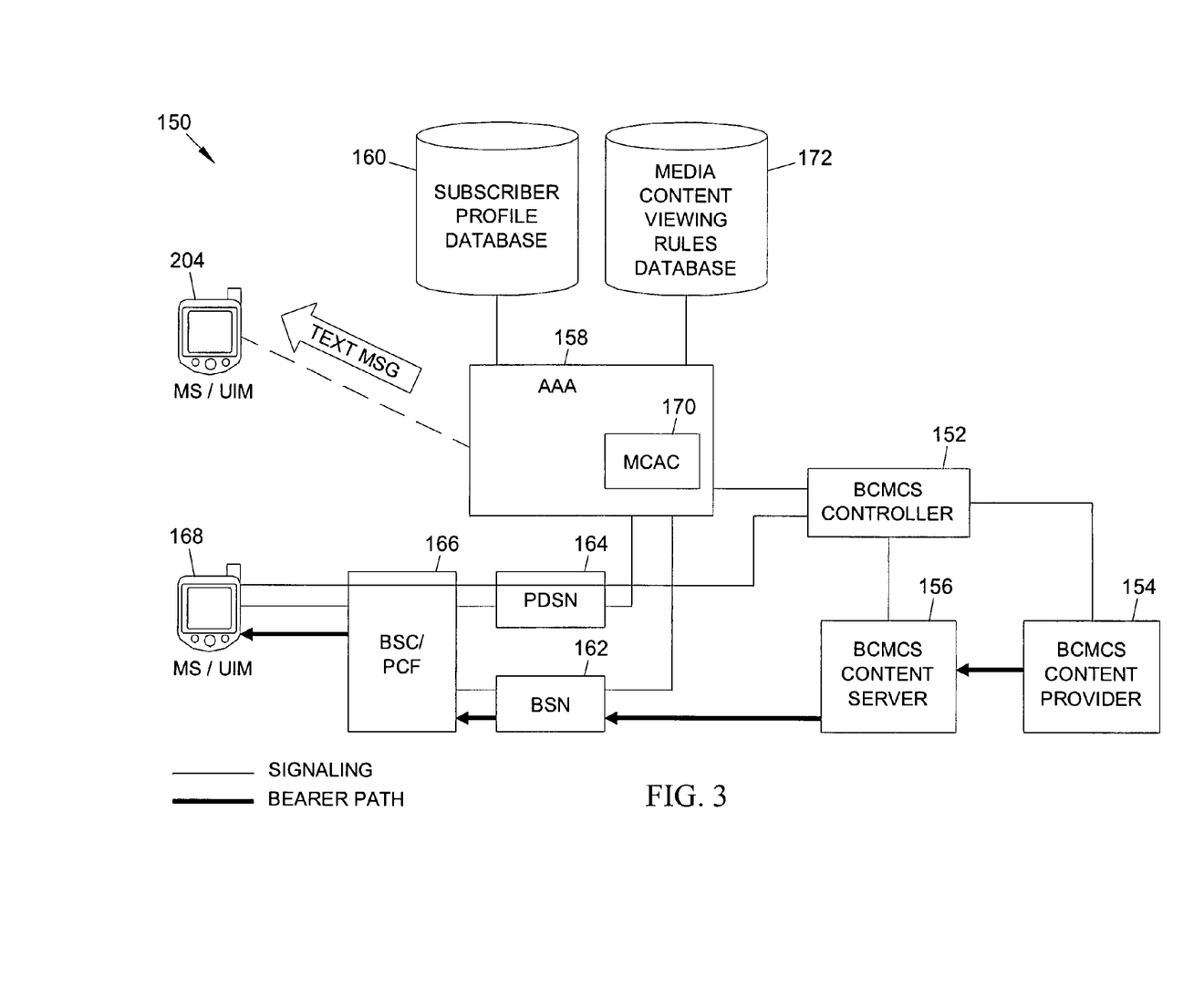
FIG. 3 is a block diagram illustrating a BCMCS delivery network and delivery of a text message to a terminal indicating violation of a media content viewing rule according to an embodiment of the subject matter described herein.

Program viewing rules may include the names of programs that a subscriber is not allowed to view. Program identification information may also include scheduling attributes of a streaming media program, such as program start time, program end time, program duration, casting and production information (e.g., actor names, director names, producer names, production entity names (e.g., HBO, Fox, ABC, CBS, Showtime, Cinemax, etc.). Such a sample rule is illustrated in the first entry of Table 1. The subscriber, identified in the BCMCS network as child@vzw.net, is prohibited from viewing a BCMCS program named "The Dirty Movie." Also defined in Table 1, with regard to the first rule entry, are an Action field and a Contact field. These fields may be used to specify an action that is to be taken if the rule criteria are satisfied. In this example, if the subscriber child@vzw.net attempts to view a BCMCS program named "The Dirty Movie," media content access controller 170 is adapted to notify the subscriber's parents of the access attempt. In one embodiment, media content access controller 170 is adapted to generate a notification message, such as a short message service (SMS) message, email message, instant message, or other messaging service message, which is communicated to the parent or guardian of the monitored subscriber (or some other designated violation notification contact), as indicated in FIG. 3. In this example, an SMS text notification message is generated by media content access controller 170 and communicated to the child's parents at SMS contact address (919) 469-1000. In this example, media content access controller 170 is further adapted to reject access to the specified BCMCS program.

Program viewing rules may specify program rating levels that a subscriber is not allowed to view. Such a sample rule is illustrated in the second entry of Table 1. The subscriber, identified in the BCMCS network as teen@vzw.net, is prohibited from viewing any BCMCS programs that have been designated with a rating value of R or X. It will be appreciated that program content rating systems other than the exemplary G, PG, PG13, R, and X system defined by the Motion Picture Association of America may be supported by the subject matter described herein. For example, the television rating system defined by the TV Parental Guidelines Board that includes TV-Y, TV-Y7, TV-MA, and other rating identifiers may also be supported by media content access controller 170.

Program viewing rules may specify attributes or expanded rating values that are associated with BCMCS programming that a subscriber is not allowed to view. Such a sample rule is illustrated in the third entry of Table 1. The subscriber, identified in the BCMCS network as student@vzw.net, is not allowed to view BCMCS programming content that contains strong sexual content (SC) or which contains profanity (P). Program attributes may include Adult Content (AC), Adult Humor (AH), Adult Language (AL or L), Adult Situations (AS), Adult Theme (AT), Brief Nudity (BN), Graphic Language (GL), Graphic Violence (GV), Mature Theme (MT), Mild Violence (MV), Nudity (N), Rape (RP), and Violence (V).

Program viewing rules may specify a BCMCS program viewing cutoff or curfew time. The time value may be used to represent the latest time that a subscriber may begin viewing a BCMCS program, or the time value may be interpreted as the time at which all BCMCS programming content ceases to be delivered or made available to a subscriber. Such a sample rule is illustrated in the third entry of Table 1. The subscriber, identified in the BCMCS network as kid@vzw.net, is not allowed to view BCMCS programming after 8 pm.

In one embodiment, media content access controller 170 may determine and/or store a program rating value associated with a requested BCMCS program in order to apply a viewing rule which includes allowed or disallowed ratings or rating levels. Media content access controller 170 may query an external program content rating system to determine a rating for a requested program. In a similar manner, media content access controller 170 may determine and/or store program attribute values associated with a requested BCMCS program in order to apply a viewing rule, which includes allowed or disallowed program attributes. Media content access controller 170 may query an external program content information system to determine attribute values for a requested program.

It will be appreciated that while the exemplary rules described above and illustrated in Table 1 represent an exclusive or blacklist rules paradigm, parental control viewing rules could also be implemented in an inclusive or whitelist rules paradigm. For example, a whitelist rule could be generated which explicitly defines the program rating levels that a subscriber is allowed to view.

With regard to the exemplary embodiment illustrated in FIG. 1, it will be appreciated that the program content viewing rules and functionality discussed above and described with respect to media content viewing rules database 172 may alternatively be stored or integrated with a BCMCS-related subscriber profile database. In such an architecture, media content access controller 170 may query the subscriber profile database to determine whether a program viewing request is in violation of a program content viewing rule associated with the requesting mobile subscriber. Alternatively, media content viewing rules database 172 may be stored or integrated with the AAA server, such that media content access controller 170 and media content viewing rules database 172 are both tightly coupled to the AAA function.

Figure 4:
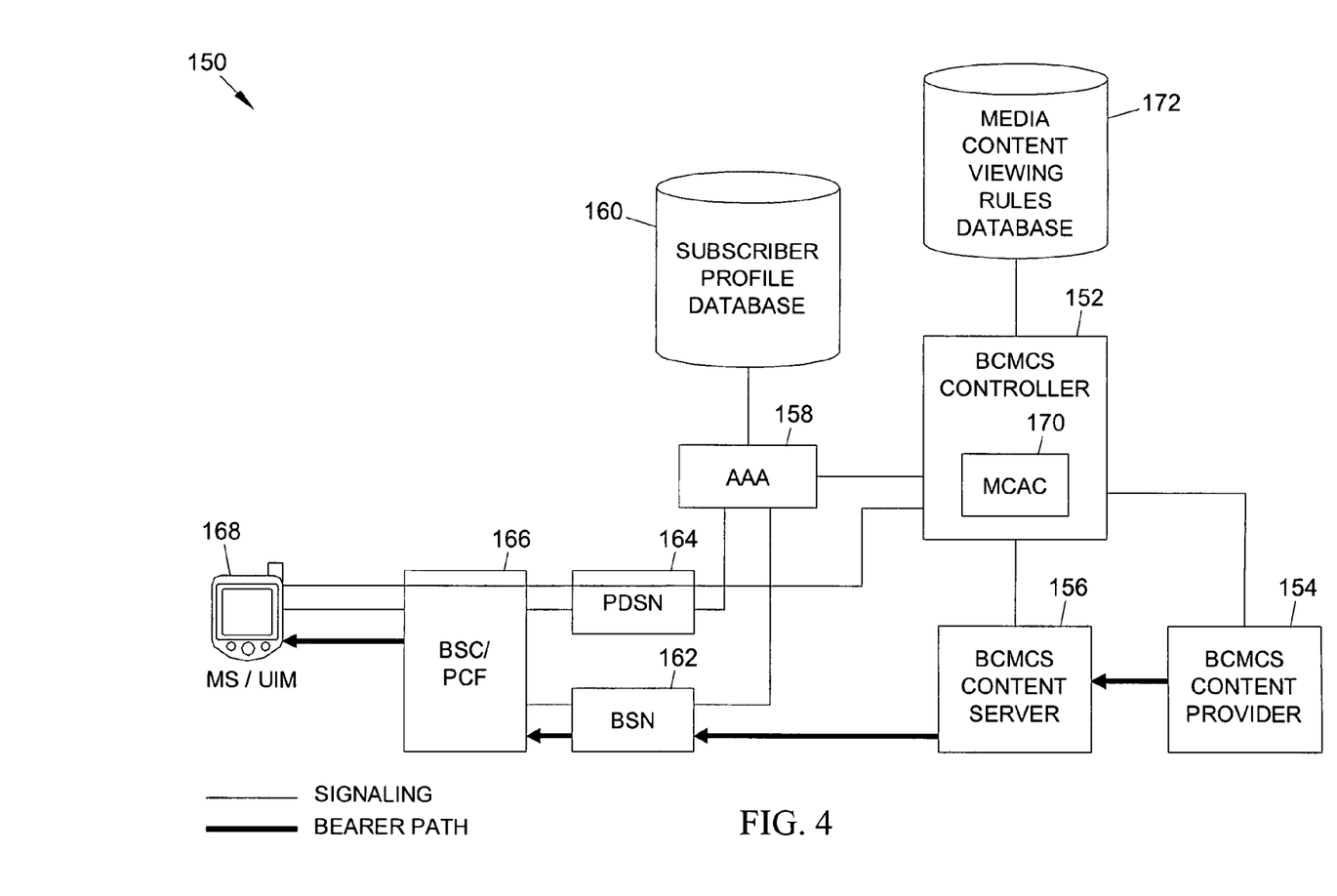
FIG. 4 is a block diagram illustrating a BCMCS content delivery network with a BCMCS-controller-implemented media content access control application according to an embodiment of the subject matter described herein.

In yet another embodiment, media content access controller 170 may be integrated with and/or co-located with a BCMCS controller, as illustrated in FIG. 4. One advantage of the this architecture is that the AAA function is shielded from unnecessary authorization transactions involving BCMCS program requests that violate the pre-defined content viewing rules that are maintained/accessed by BCMCS controller 152. For example, when a mobile subscriber requests the BAK for a BCMCS program using an InformationAcquisitionRequest message, media content access controller access controller 170 associated with BCMCS controller 152 is adapted to extract requested program ID and requesting mobile subscriber ID information from the message and query media content viewing rules database 172 to determine if viewing of the requested BCMCS program by the requesting mobile subscriber violates any viewing rules that have been defined for the mobile subscriber. In the case that a rule violation is detected, BCMCS-controller-implemented media content access controller 170 is adapted to return an InformationAcquisitionReject message to the requesting mobile subscriber without initiating a RADIUS AccessRequest transaction with AAA function 158. As such, the AAA is minimally burdened by the inappropriate program viewing request.

Figure 5:
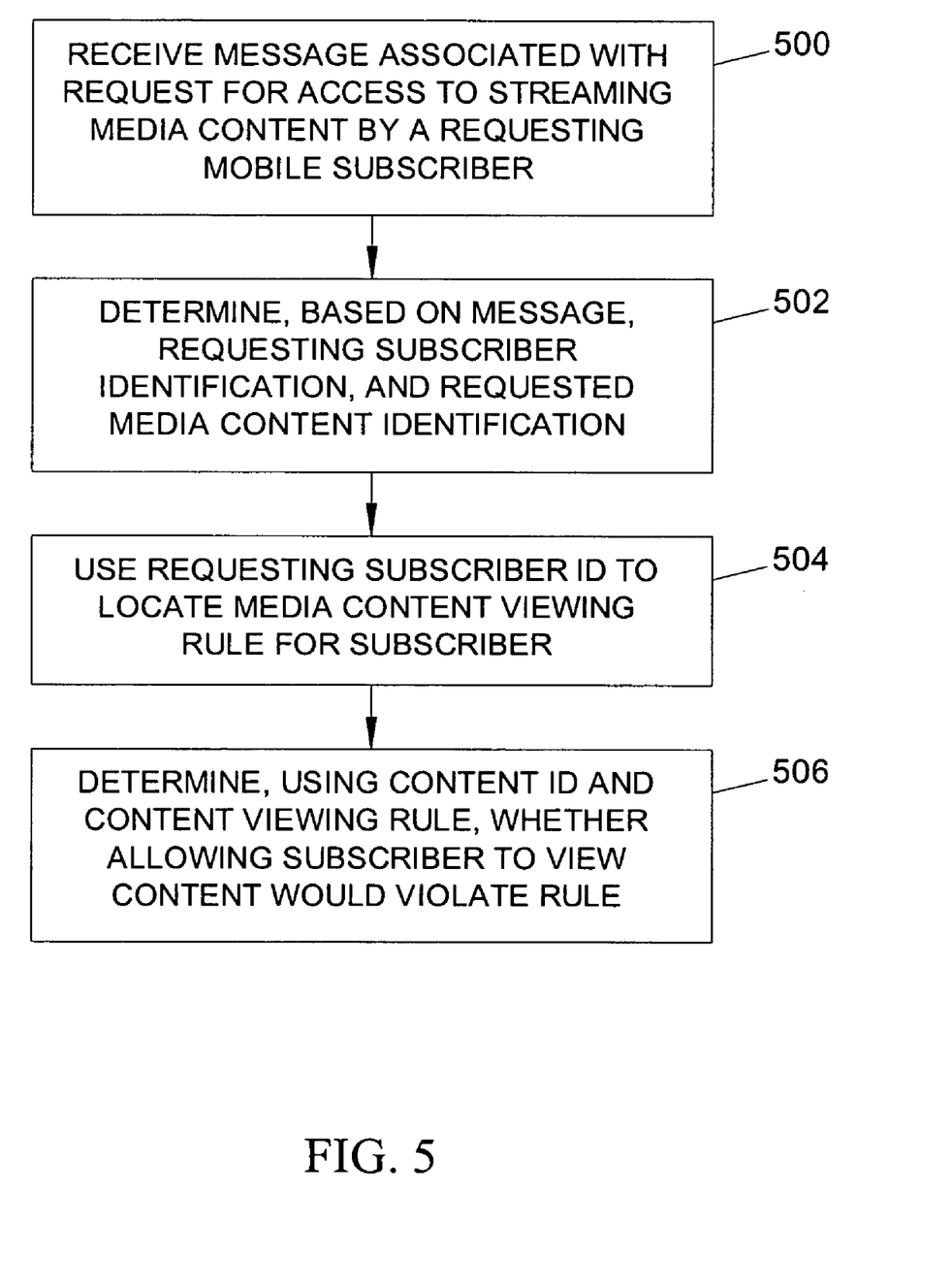
FIG. 5 is a flow chart illustrating exemplary steps for third-party control of access to media content accessible by a subscriber terminal via a BCMCS according to an embodiment of the subject matter described herein.

FIG. 5 is a flow chart illustrating an exemplary method for controlling access to streaming media content by a subscriber via a broadcast and multicast service according to an embodiment of the subject matter described herein. Referring to FIG. 5, in step 500, a message associated with a request for access to streaming media content by a requesting mobile subscriber is received. In step 502, requesting mobile subscriber identification and requesting content identification are identified from the message. In step 504, the mobile subscriber identification is used to identify a content viewing rule for the requesting mobile subscriber. In step 506, the content identification is used to determine whether allowing the user view the content would violate the content viewing rule.

Figure 6A:
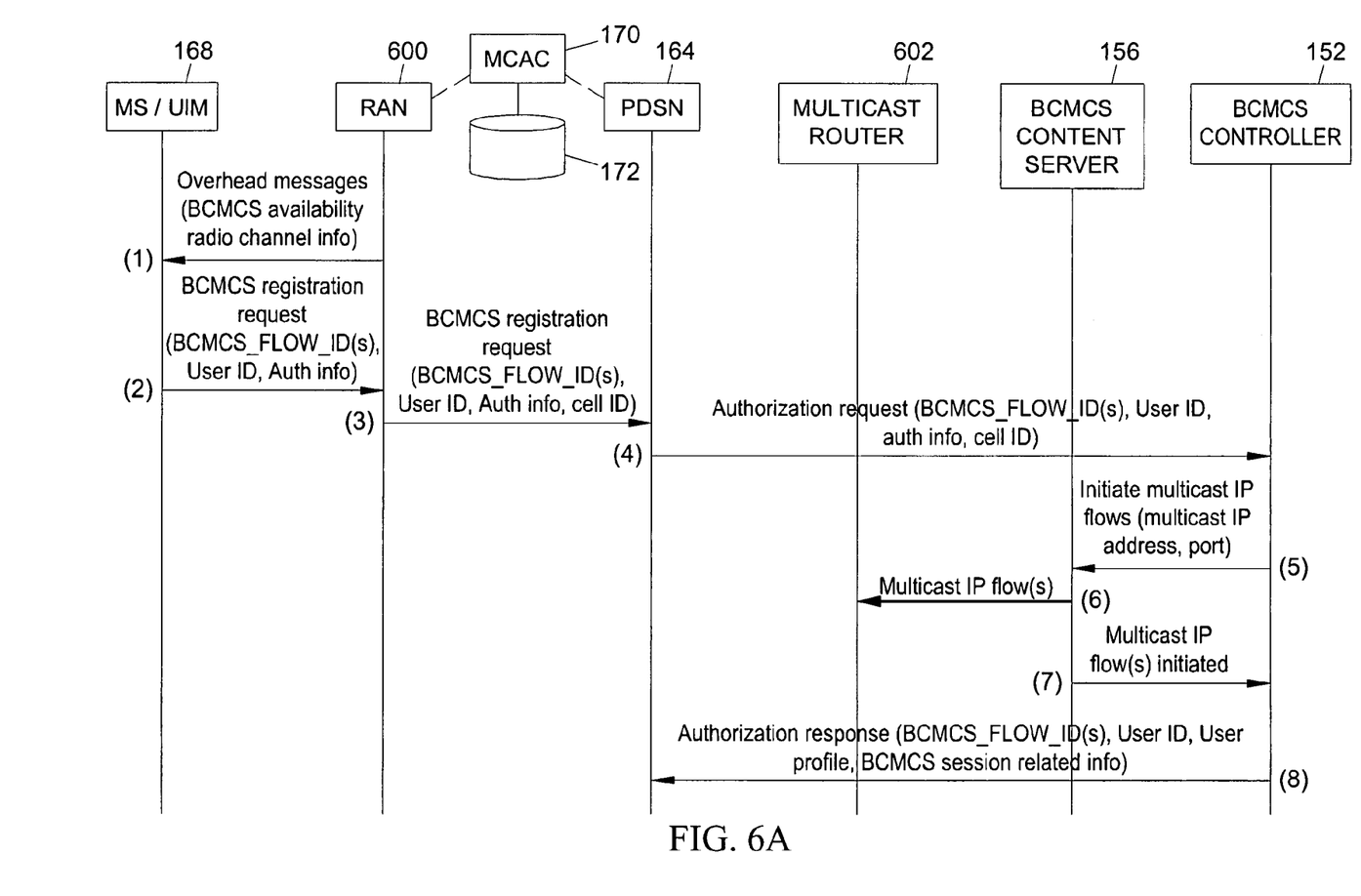
FIGS. 6A and 6B are a message flow diagram illustrating an exemplary media content access controller that is implemented at a packet data support node or a radio access network (RAN) signaling node according to an embodiment of the subject matter described herein.
Figure 6B:
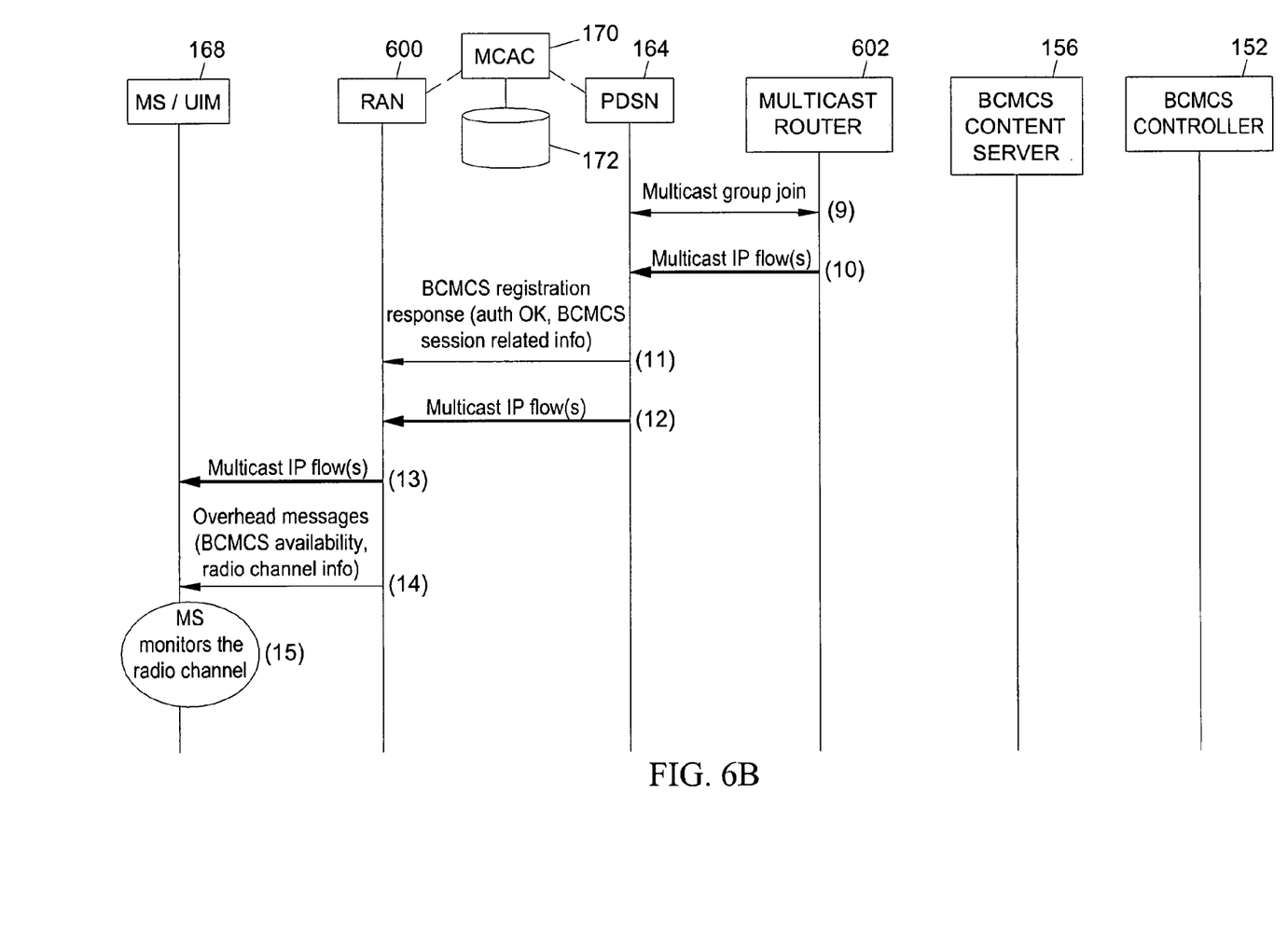

Although in the examples described above, the media content access controller and the media content viewing rules database are components of either the AAA network node or the BCMCS controller node, the subject matter described herein is not limited to implementing access control at only these nodes. The media content access controller and the media content viewing rules database may be implemented at any node that receives a media content viewing request sent by or on behalf of a subscriber. For example, the media content access controller and the media content viewing rules database may be components of a radio access network (RAN) signaling node or a packet data support node (PDSN) that receive and process messages associated with providing media content to a subscriber via a BCMCS. FIGS. 6A and 6B illustrates this concept. In FIGS. 6A and 6B, a radio access network (RAN) signaling node 600 and PDSN 164 both receive the BCMCS registration request message from mobile station 168. The BCMCS registration request message specifies the BCMCS flow ID, which identifies the BCMCS program that the subscriber desires to view. Accordingly, media content access controller 170 and media content viewing rules database 172 may be implemented at RAN signaling node 600 or PDSN 164 without departing from the scope of the subject matter described herein.

In such an implementation, media content access controller 170 would extract the subscriber identifier and the flow identifier from the BCMCS registration request message, locate the corresponding media content viewing rule in database 172, and determine whether to allow the subscriber to view the requested content based on a comparison of the flow identifier to the rule. If access is refused, MCAC 170 may send a message to MS 168 indicating that access is denied and the reason for the denial. MCAC 170 may also notify a third party, such as a parent, of subscriber 168 of the attempted access, in the manner described above. If access is allowed, the message flow may proceed as illustrated in FIGS. 6A and 6B where the requested media content is delivered to MS 168 via media content server 156, multicast router 602, PDSN 164, and RAN signaling node 600. It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for controlling access to streaming media content by a subscriber via a broadcast and multicast service (BCMCS), the method comprising:
at a network element associated with delivery of streaming media content to a subscriber terminal via a BCMCS:
(a) receiving a message associated with a request for access to streaming media content by a requesting mobile subscriber, wherein the streaming media content is accessible via the BCMCS, where the streaming media content is made available for viewing over a mobile communications network to a plurality of mobile subscribers who join a broadcast or multicast group through which the content is offered;
(b) determining requesting mobile subscriber identification and requested content identification associated with the message;
(c) using the mobile subscriber identification to identify a content viewing rule for the requesting mobile subscriber; and
(d) using the content identification to determine whether allowing the subscriber to view the content would violate the content viewing rule, wherein the content viewing rule is provisionable by or on behalf of a third party separate from a BCMCS network provider or BCMCS content provider and separate from the mobile subscriber to allow the third party to control the viewing of BCMCS-provided content by the mobile subscriber.

2. The method of claim 1 wherein performing steps (a)-(d) at a network element associated with delivery of streaming media content to a subscriber terminal via a BCMCS includes performing steps (a)-(d) at a BCMCS controller.

3. The method of claim 1 wherein performing steps (a)-(d) at a network element associated with delivery of streaming media content to a subscriber terminal via a BCMCS includes performing steps (a)-(d) at a authentication, authorization, and accounting (AAA) function.

4. The method of claim 1 wherein performing steps (a)-(d) at a network element associated with delivery of streaming media content to a subscriber terminal via a BCMCS includes performing steps (a)-(d) at a radio access network (RAN) signaling node.

5. The method of claim 1 wherein performing steps (a)-(d) at a network element associated with delivery of streaming media content to a subscriber terminal via a BCMCS includes performing steps (a)-(d) at a packet data support node (PDSN).

6. The method of claim 1 wherein receiving a message associated with the request for access to streaming media content by a requesting mobile subscriber includes receiving a BCMCS InformationAcquisition Request message.

7. The method of claim 1 wherein receiving a message associated with a request for access to streaming media content by a requesting mobile subscriber includes receiving a RADIUS AccessRequest message.

8. The method of claim 1 wherein receiving a message associated with a request for access to streaming media content by a requesting mobile subscriber includes receiving a BCMCS registration request message.

9. The method of claim 1 comprising, in response to determining that the content viewing rule would be violated, preventing access to the requested streaming media content by the requesting mobile subscriber.

10. The method of claim 9 wherein preventing access to the requested streaming media content by the requesting mobile subscriber includes preventing the distribution of a broadcast access key (BAK) to the requesting mobile subscriber.

11. The method of claim 1 comprising, in response to determining that the content viewing rule would be violated, generating a violation notification message.

12. The method of claim 11 comprising sending the violation notification message to a parent or guardian of the requesting mobile subscriber.

13. The method of claim 1 comprising using the requested content identification information to determine a rating value associated with the requested content.

14. The method of claim 1 comprising using the requested content identification information to determine a program content attribute value associated with the requested content.

15. The method of claim 1 wherein the media content viewing rule is provisionable by a party other than the subscriber and a provider of the streaming media content.

16. A system for controlling the access to streaming media content to be delivered to a subscriber terminal via a broadcast and multicast service (BCMCS), the system comprising:
(a) a network element associated with the delivery of streaming media content to a mobile subscriber, the network element being adapted to receive a message associated with a request for access to streaming media content by a requesting mobile subscriber, wherein the streaming media content is accessible via the BCMCS, where the streaming media content is made available for viewing over a mobile communications network to a plurality of mobile subscribers who join a broadcast or multicast group through which the content is offered;
(b) a media content viewing rules database including mobile-subscriber-specific streaming media content viewing rules; and
(c) a media content access controller associated with the network element for determining requesting mobile subscriber identification and requested media content identification information associated with the message and using the requesting mobile subscriber identification and requested media control identification information to access the media content viewing rules database, identify a media content viewing rule for the requesting subscriber and determine whether allowing the subscriber to view the content would violate the content viewing rule, wherein the content viewing rule is provisionable by or on behalf of a third party separate from a BCMCS network provider or BCMCS content provider and separate from the mobile subscriber to allow the third party to control the viewing of BCMCS-provided content by the mobile subscriber.

17. The system of claim 16 wherein the network element comprises a BCMCS controller.

18. The system of claim 16 wherein the network element comprises an authentication, authorization, and accounting (AAA) function.

19. The system of claim 16 wherein the network element comprises a radio access network (RAN) signaling node.

20. The system of claim 16 wherein the network element comprises a packet data support node (PDSN).

21. The system of claim 16 comprising a BCMCS subscriber profile database co-located with the media content viewing rules database.

22. The system of claim 16 wherein the media content access controller is adapted to use the requested program identification information to determine a rating value associated with the requested program.

23. The system of claim 16 wherein the media content access controller is adapted to use the requested program identification information to determine a program content attribute value associated with the requested program.

24. The system of claim 16 wherein the media content access controller is adapted to generate a violation notification message in response to determining that the program viewing request by the mobile subscriber violates a content viewing rule.

25. The system of claim 24 wherein the media content access controller is adapted to send the violation notification message to a parent or guardian of the mobile subscriber.

26. The system of claim 16 compromising a provisioning interface for allowing a party other than the subscriber and a provider of the streaming media content to provision media content viewing rules for the subscriber in the media content viewing rules database.

27. A computer program product comprising computer executable instructions embodied in a computer readable medium for performing steps comprising:
   at a network element associated with delivery of streaming media content to a subscriber terminal via a BCMCS:
   (a) receiving a message associated with a request for access to streaming media content by a requesting mobile subscriber, wherein the streaming media content is accessible via the BCMCS, where the streaming media content is made available for viewing over a mobile communications network to a plurality of mobile subscribers who join a broadcast or multicast group through which the content is offered;
   (b) determining requesting mobile subscriber identification and requested content identification associated with the message;
   (c) using the mobile subscriber identification to identify a content viewing rule for the requesting mobile subscriber; and
   (d) using the content identification to determine whether allowing the subscriber to view the content would violate the content viewing rule, wherein the content viewing rule is provisionable by or on behalf of a third party separate from a BCMCS network provider or BCMCS content provider and separate from the mobile subscriber to allow the third party to control the viewing of BGMCS-provided content by the mobile subscriber.

28. The computer program product of claim 27 wherein performing steps (a)-(d) at a network element associated with delivery of streaming media content to a subscriber terminal via a BCMCS includes performing steps (a)-(d) at a BCMCS controller.

29. The computer program product of claim 27 wherein performing steps (a)-(d) at a network element associated with delivery of streaming media content to a subscriber terminal via a BCMCS includes performing steps (a)-(d) at a authentication, authorization, and accounting (AAA) function.

30. The computer program product of claim 27 wherein performing steps (a)-(d) at a network element associated with delivery of streaming media content to a subscriber terminal via a BCMCS includes performing steps (a)-(d) at a radio access network (RAN) signaling node.

31. The computer program product of claim 27 wherein performing steps (a)-(d) at a network element associated with delivery of streaming media content to a subscriber terminal via a BCMCS includes performing steps (a)-(d) at a packet data support node (PDSN).

32. The computer program product of claim 27 wherein receiving a message associated with the request for access to streaming media content by a requesting mobile subscriber includes receiving a BCMCS InformationAcquisitionRequest message.

33. The computer program product of claim 27 wherein receiving a message associated with a request for access to streaming media content by a requesting mobile subscriber includes receiving a RADIUS AccessRequest message.

34. The computer program product of claim 27 wherein receiving a message associated with a request for access to streaming media content by a requesting mobile subscriber includes receiving a BCMCS registration request message.

35. The computer program product of claim 27 comprising, in response to determining that the content viewing rule would be violated, preventing access to the requested streaming media content by the requesting mobile subscriber.

36. The computer program product of claim 35 wherein preventing access to the requested streaming media content by the requesting mobile subscriber includes preventing the distribution of a broadcast access key (BAK) to the requesting mobile subscriber.

37. The computer program product of claim 27 comprising, in response to determining that the content viewing rule would be violated, generating a violation notification message.

38. The computer program product of claim 37 comprising sending the violation notification message to a parent or guardian of the requesting mobile subscriber.

39. The computer program product of claim 27 comprising using the requested content identification information to determine a rating value associated with the requested content.

40. The computer program product of claim 27 comprising using the requested content identification information to determine a program content attribute value associated with the requested content.

41. The computer program product of claim 27 wherein the media content viewing rule is provisionable by a party other than the subscriber and a provider of the streaming media content.

* * * * *